Patented Oct. 3, 1950

2,524,315

UNITED STATES PATENT OFFICE 2,524,315

ADHESIVE COMPOSITION FOR AIR FILTERS AND THE METHOD OF PREPARING SAME

Chester M. Himel and Lee O. Edmonds, Bartlesville, Okla., assignors to Phillips Petroleum Company, a corporation of Delaware No Drawing. Application December 17, 1948, Serial No. 65,972

8 Claims. (Cl. 106—218)

This invention relates to a composition of matter useful for increasing the efficiency of air-filters and to a method for the preparation of air-filters, having highly satisfactory filtering properties, especially useful for filtering dust and like matter from fluids such as air or gases. In one of its aspects this invention relates to the preparation of a novel composition of matter having adhesive properties useful in air filtering means. In another of its aspects this invention relates to a novel filtering means.

The removal of dust and other matter in particle or other sub-divided or minute form from fluids such as gases or air, for example in the preparation of such fluids for chemical or other use as in industry or in air-conditioning has become an important art. Thus, the removal of dust from air used in air-conditioning of homes, offices, public buildings, etc., is now widely and ever increasingly practiced. The abatement of certain industrial dusts, etc., is also widely practiced. Although there are many different types of filters used, for example, liquid spray type, electrostatic precipitation type, cyclone separator type and perhaps others, the simple mechanical filter, wherein the fluid containing the matter to be removed or filtered therefrom is passed through a substance or medium which presents opportunity for settling out within its interstices to said matter to be removed, is widely and ever increasingly employed. Such filters are usually made of glass wool or other suitable fibrous or porous substances. To increase the efficiency of such filters the filtering mass has been impregnated or permeated with an adhesive. For example, adhesives composed of petroleum base materials containing various rosins have been employed to increase the efficiency of fluid filtering media.

An adhesive which is highly effective in removing dust and like matter from fluids, for example air, and which is non-hygroscopic, non-volatile, non-toxic, non-inflammable, non-corrosive to metals, and which is dripless is desirable in the filtering art.

According to this invention there is provided an adhesive composition having each of the six foregoing very desirable characteristics, prepared from erythritol ether-containing residuum, resulting from the manufacture of erythritol, by heating said residuum with wood rosin to form a homogeneous mass and then dissolving said mass in a high boiling saturated petroleum solvent. Still according to this invention, the resulting solution, applied to conventional air filtration media, is highly effective to remove suspended matter from air or other fluids and its efficacy is considerably greater than that of an adhesive prepared from wood rosin alone.

The erythritol ether-containing residues used in the preparation of the adhesive of this invention are those obtained as by-products from the manufacture of erythritol wherein butadiene is hydroxylated with hydrogen peroxide. These residues remain in the retort after erythritol has been removed. These residues comprise mixed polyerythritol ethers containing from two to four erythritol groups per molecule as well as relatively small quantities of unidentified materials. Other residues which can be used in the preparation of an adhesive according to this invention are those obtained as by-products from the manufacture of polyhydric alcohols from olefins having up to about ten carbon atoms to the molecule, using hydrogen peroxide as above set forth. The novel composition of this invention provides a use for these residues which have not, heretofore, been found to have any appreciable commercial value.

The wood rosin used in the preparation of the composition of this invention can be the residue remaining when gum turpentine, or pine sap, is distilled to remove turpentine and water therefrom. This distillation is sometimes effected with the aid of steam or the distillation residues can be steamed. The wood rosin used can also be prepared by the dry distillation of wood. In any event, the term "wood rosin" as employed herein and in the claims, denotes a material which is substantially the equivalent of the wood rosins just described.

The high boiling saturated petroleum solvent used in the preparation of the adhesive of the invention will be usually a mineral lubricating oil, for example, an additive-free S. A. E. 10 motor oil. It will be understood that the invention is not limited to the use of the particular oil or quantity set forth. Equivalent oils can be readily determined by mere routine test. Also the extent of dilution which can be practiced can be determined in a like manner. A concentration of from about 10% to about 40% of the heated residuum-rosin mass in the oil is now preferred.

The proportions of erythritol residuum and rosin employed may vary over a broad range. However, as the proportion of the erythritol residuum is reduced the efficacy of the adhesive is reduced until it reaches that of the rosin alone. Though the invention is not limited thereto proportions of about two parts by weight of erythritol residuum to about three to seven parts by weight of rosin are now preferred.

The heating of the admixture of the erythritol residuum and the wood rosin is continued until a substantially homogeneous mass is obtained. Temperatures in the range of from about 250° F. to about 350° F. are preferred. Still more preferably, a temperature in the range 275° F. to 325° F. is employed. The heating is preferably effected at a pressure in the range of from about one to about twenty millimeters mercury to promote the formation of esters from the rosin and the residues.

The composition of the invention is non-hygroscopic and after absorption of a very low concentration of moisture, retains a constant equilibrium between absorbed and transmitted moisture. Its evaporation rate is very low, even at temperatures far above normal, say up to 200° F. It is substantially odorless unless heated to extreme temperatures and even at its boiling point does not emit toxic vapors. Its flash and fire points are high, thus eliminating it as a potential fire hazard. It is non-toxic to the skin and no problems are encountered in manufacturing filters or servicing air conditioning equipment employing filters permeated with our composition. It is non-corrosive, that is, it is inactive toward metal surfaces, and does not promote bimetallic corrosion. The composition is compatible with other compounds and does not drip from a vertical filter at temperatures encountered in normal air filtration.

*Example*

Two hundred and nine grams of erythritol residues was heated with 300 grams of "Staybelite" (wood) rosin at 300 F., at 10 mm. Hg, for two hours. This product was then dissolved in an additive-free S. A. E. 10 motor oil to give a 25 per cent solution. The properties of this product are:

Pour point, 0° F.
Viscosity (100° F.), Saybolt Universal Seconds 642
Flash point, 400° F.
Fire point, 450° F.

No separation of layers occurred on blowing moist air through the oil solution for twelve hours.

An experiment was conducted wherein an air filter comprising glass wool permeated with the product of the invention was placed in a dust laden air stream. A beam of light directed across the air stream prior to its entry into the filter was clearly visible. A similar light beam in the filtered air stream was not discernible indicating substantially complete removal of dust by the filter.

Moisture retention of the filter was determined by reading wet bulb thermometers placed in the air stream on each side of the filter. Air of controlled humidity was passed through the filter and readings were made on the thermometers at 30 minute intervals. Corresponding values from the two instruments over an eight hour period indicated substantially no moisture pickup by the filter or adhesive composition.

Reasonable variation and modification is possible within the scope of the appended claims to the invention, the essence of which is that erythritol residues, upon heating with wood rosin to obtain a substantially homogeneous mass which is dissolved in a high boiling substantially saturated petroleum solvent, will yield an effective adhesive for use in air or other fluid filters, said adhesive having a large number of greatly desired properties.

We claim:

1. The preparation of an adhesive, suitable for use in fluid filters, which comprises heating at a temperature in the range 250–350° F. an erythritol ether-containing residuum, resulting from the manufacture of a polyhydric alcohol from an olefin having up to ten carbon atoms to the molecule using hydrogen peroxide, with wood rosin until a substantially homogeneous mass has been obtained and then dissolving said mass in a high boiling substantially saturated petroleum solvent.

2. The adhesive as prepared in claim 1.

3. The preparation of an adhesive, suitable for use in fluid filters, which comprises heating at a temperature in the range 250° F.–350° F., an erythritol residuum, resulting from the manufacture of erythritol wherein butadiene is hydroxylated with hydrogen peroxide, with a wood rosin until a substantially homogeneous mass has been obtained and then dissolving said mass in a mineral lubricating oil to yield the desired adhesive.

4. The preparation of an adhesive, suitable for use in fluid filters, which comprises heating at a temperature in the range 250° F.–350° F. and in vacuo an erythritol residuum, resulting from the manufacture of erythritol wherein butadiene is hydroxylated with hydrogen peroxide, with a wood rosin in a proportion by weight of the erythritol residuum of about two parts of residuum to about three to seven parts rosin until a substantially homogeneous mass has been obtained and then dissolving said mass in a mineral lubricating oil to yield the desired adhesive.

5. The adhesive of claim 4.

6. The preparation of an adhesive material suitable for dilution with a mineral oil to form an adhesive composition which is adapted for impregnation of a filter mass which comprises heating at a temperature in the range 250–350° F. an erythritol residuum, resulting from the manufacture of a polyhydric alcohol from an olefin having up to 10 carbon atoms to the molecule using hydrogen peroxide, with wood rosin until a substantially homogeneous mass has been obtained.

7. The preparation of the adhesive material of claim 6 wherein the heating is effected at a temperature in the range 250° F. to 350° F. and the erythritol residuum is one resulting from the manufacture of erythritol wherein butadiene is hydroxylated with hydrogen peroxide.

8. The material of claim 7.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,122,514 | Crocker | July 5, 1938 |
| 2,145,898 | Simpson | Feb. 7, 1939 |
| 2,178,614 | Slayter | Nov. 7, 1939 |
| 2,347,031 | Cupery | Apr. 18, 1944 |